United States Patent [19]

Hall

[11] 3,715,722

[45] Feb. 6, 1973

[54] DATA NORMALIZATION SYSTEM

[75] Inventor: Richard E. Hall, Rochester, Minn.

[73] Assignee: International Business Machines Corporation, Armonk, N.Y.

[22] Filed: July 2, 1971

[21] Appl. No.: 159,285

[52] U.S. Cl. ........................340/146.3 H, 178/DIG. 3

[51] Int. Cl. ..............................................G06r 9/00

[58] Field of Search...........340/146.3 H; 178/DIG. 3; 325/38 A, 38 B; 179/15 BV

[56] References Cited

UNITED STATES PATENTS 3,522,585 8/1970 Lemay..........................340/146.3 H

*Primary Examiner*—Thomas A. Robinson

*Attorney*—Karl O. Hesse et al.

[57] ABSTRACT

A data normalization system including sampling of interpolation functions generated from original fixed pitch data samples. The accuracy of digital data generated from the interpolation function is increased by modulating the binary discrimination threshold.

11 Claims, 3 Drawing Figures

PATENTED FEB 6 1973 3,715,722

SHEET 1 OF 2

INVENTOR.
RICHARD E. HALL
BY Karl O. Hesse
AGENT

DATA NORMALIZATION SYSTEM

FIELD OF THE INVENTION

This invention relates to electrical communications in general, and more specifically to character recognition systems for use in electrical communications.

DESCRIPTION OF THE PRIOR ART

A number of data normalization systems are known for normalizing data received from the continuous output of a flying spot scanner. Because the output of a flying spot scanner is continuous, the number of scans and the location of sample points on each scan can be readily changed by merely modifying the timing pulses, thereby accomplishing data normalization.

In a fixed pitch scanner, such as an area matrix photosensor array or an incremented linear photosensor array, the possibility of changing the number of sample points or the location of sample points across a character being scanned does not exist, except by physically moving the elements within the array or changing the optical magnification of the system. These physical changes are difficult to accomplish with accuracy, and result in slow system operation. Data from a fixed pitch array of photosensors could be normalized by selecting those columns of the array that coincide with the desired normalized scan paths and those photocells within each chosen column that coincide with the desired sample points. That method requires a very high density of photosensors in the array, in order to assure that a photosensor will exist at the location of a normalized scan and a normalized sample point. Besides increasing the cost, that method of normalization is limited by the finite number of discrete photosensors that can be placed on a matrix area or a linear array.

SUMMARY OF THE INVENTION

It is an object of this invention to normalize data from a fixed pitch scanner in an improved manner.

A further object is to normalize data in such a manner so as to increase the effective density of samples from a fixed pitch scanner.

A still further object of this invention is to construct waveforms that approximate waveforms that would be provided by a flying spot scanner from fixed pitch data samples.

It is also an object of this invention to decide which original data samples are to be considered when constructing the waveforms, using a simplified method and apparatus.

The construction of waveforms approximating waveforms that would be generated by a flying spot scanner is accomplished through the use of a plurality of interpolation steps to generate waveforms representing scans along virtual scan paths which can, in turn, be sampled at virtual sample points. The use of interpolation functions in accordance with this invention provides reflected light amplitude information at points within the array at which no photosensor is physically located. The constructed waveform is converted into normalized binary data by a binary sampling gate having a modulated threshold voltage, thereby generating digital data which has accuracy characteristics equivalent to digital data generated at higher normalized sampling rates.

DESCRIPTION OF A PREFERRED EMBODIMENT

Figure 1:
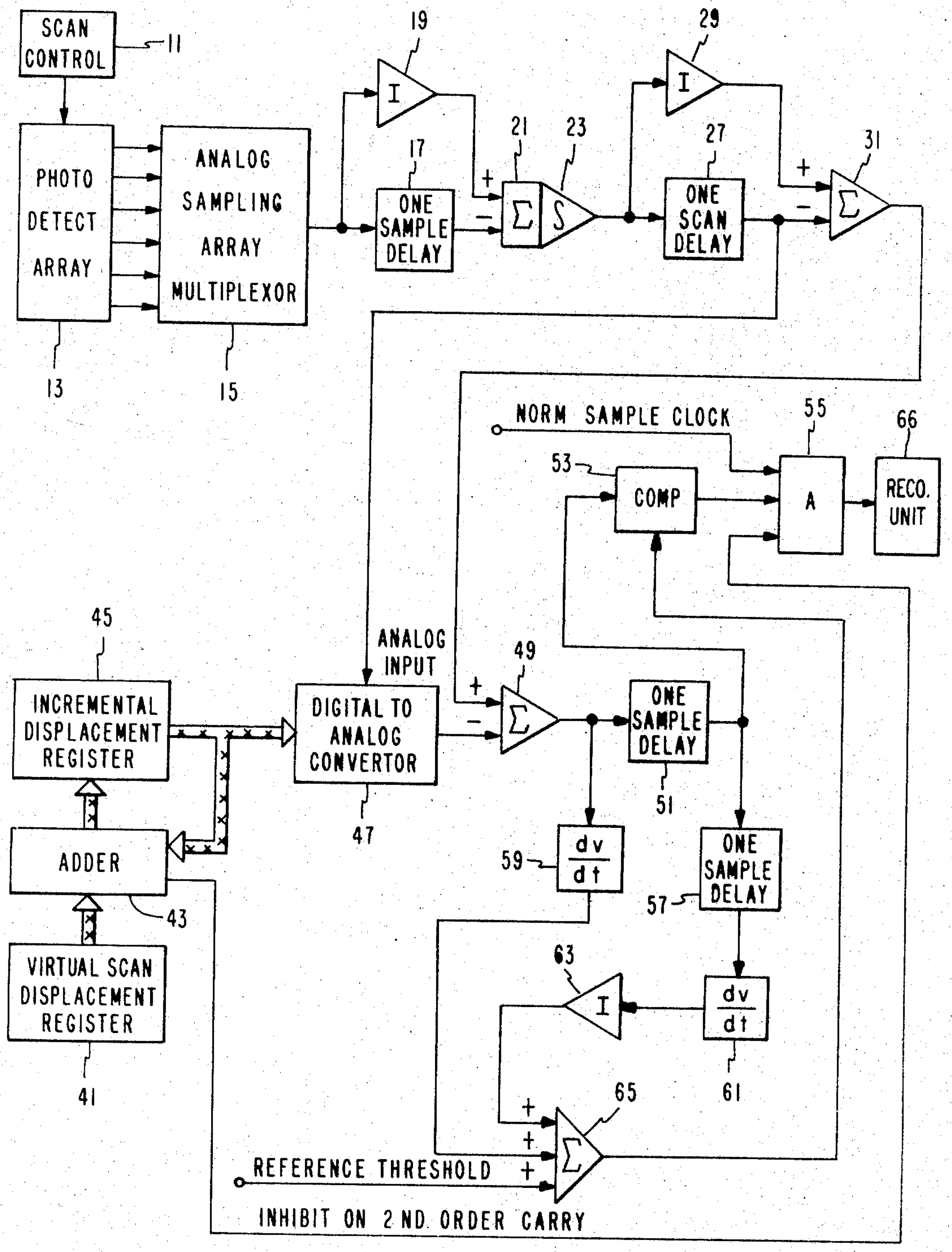
FIG. 1 shows a block diagram of one embodiment of the invention.

Referring not to FIG. 1, a detailed description of a preferred embodiment of the invention will be set forth. Information on a document is detected by means of an array of photosensors 13 under control of scan control 11. Photodetector array 13 can be an area matrix of photosensors or an incremented linear photosensor array. If an area matrix of photosensors is utilized, scan control 11 will be in the form of a plurality of electronic switches for connecting outputs from the plurality of photosensors in each column to the plurality of inputs of analog switching multiplexor 15 sequentially column-by-column. If photodetector array 13 is a linear array of photosensors, scan control 11 will be a mechanical incrementing means for physically moving array 13 over a document or physically moving the document relative to array 13 to accomplish scanning. Analog switching multiplexor 15 is a straightforward application of the time-division multiplexing art, wherein each input line contains an analog switch for sequentially switching input lines to the output line in sequence. Scan control 11, photodetector array 13 and analog switching multiplexor 15 comprise a scanning means for scanning a document and providing a sequence of analog voltage samples having amplitudes proportional to light reflected from areas of the document at a first scanning rate proportional to the photosensor column spacing and at a first sampling rate proportional to photosensor row spacing.

In order to allow comparison of a present array sample with a previous array sample for purposes of interpolation, a one-sample delay means 17 is provided, which has an input connected to the output of analog switching multiplexor 15 and an output connected to one input of summing circuit 21. Sample delay 17 is an analog delay circuit which may be implemented in any well-known way, including a transmission line, a magnetostrictive delay line and so forth.

In order to generate a voltage representing the difference between a present array sample and a delayed array sample of the analog voltage samples provided at the output of multiplexor 15, a first difference generating means including unity gain inverting amplifier 19 and a summing circuit 21 is provided. Inverting amplifier 19 has an input connected to the output of multiplexor 15, and an output connected to a second input of summing circuit 21. Summing circuit 21 may be in the form of summing resistors connected to the inverting input of an operational amplifier, which in turn forms part of integrating circuit 23 connected to the output of summing circuit 21. Inasmuch as the combination of summing circuits and integrating circuits implemented using operational amplifiers is well known in the art of analog computation, the detailed circuitry of summing circuit 21 and integrator 23 will not be described at this point.

Integrating circuit 23 is connected to the output of summing circuit 21 for integrating the differences between present and delayed samples to generate an output waveform, which will be designated a first interpolation function. The output waveform generated by integrator 23 is an approximation of the waveform that would be provided by the output of a single photodiode as it was continuously moved from one end to the other end of a column within photodetector array 13. The output provided at integrating circuit 23 thus approximates the output that would be provided had a flying spot scanner been used to detect a single scan of information from the document.

In order to allow comparison between a first interpolation function generated from array samples from one array column and with a first interpolation function generated from array samples from an adjacent array column, one-scan circuit 29 is provided. One-scan delay circuit 29 is very similar to one-sample delay circuit 17 with the exception that its analog signal propagation delay time period is one array scan in duration, as compared with the one array sample time period delay provided by delay 17. The input of scan delay circuit 27 is connected to the output of integrating circuit 23, and the output of scan delay circuit 27 is connected to one input of summing circuit 31.

A second difference generating means, including inverting amplifier 29 and summing circuit 31, is provided to generate an analog signal proportional to the difference between the first interpolation function and the delayed first interpolation function, in preparation for generating a second interpolation function. The input of inverting amplifier 29 is connected to the output of integrating circuit 23 and the output of inverting amplifier 29 is connected to a second input of summing circuit 31. Summing circuit 31 and inverting amplifier 29 are similar to summing circuit 21 and inverting amplifier 19. In this embodiment of the invention, summing circuit 31 comprises resistors at each of the inputs connected to the current summing node of an operational amplifier as is well-known in the analog computation art.

In preparation for interpolation between data detected at array scan columns provided by the scanning means, a fraction generating means, including multiplying means in the form of digital-to-analog converter 47, incremental displacement register 45, adder 43, and virtual-scan displacement register 41, is provided for generating an analog signal having an amplitude which is a fraction of the output of the second difference generating means. The value of the fraction, which effectively multiplies the output of the second difference generating means, is determined by the ratio of the displacement of a normalized virtual scan from the position of its closest left-most column of photosensors of photodetector array 13 to the displacement between columns of photosensors. Digital-to-analog converter 47 has a reference-voltage input connected to the output of summing circuit 31 of the second difference generating means. Digital-to-analog converter 47 also has a plurality of digital inputs connected to the output of incremental displacement register 45. The outputs of incremental displacement register 45 are also connected to a first plurality of inputs of adder 43. Adder 43 has a second plurality of inputs connected to the outputs of register 41. Adder 43 has a plurality of outputs connected to the data inputs of incremental displacement register 45 for loading the sum of a previous incremental displacement fraction stored in register 45 and a fraction proportional to the spacing between virtual scans received from register 41 into register 45 as the new incremental displacement fraction. Adder 43, register 45, and converter 47 each have the same number of binary stages. Adder 43 also has additional carry stages. The number of stages is determined by the accuracy with which it is desired to locate normalized virtual-scan positions between the original fixed-pitch column positions of array 13, as controlled by incrementing scan control 11. For the purposes of this embodiment, five stages have been chosen, so that a virtual scan can be located between original fixed-pitch array columns to within one part in 32.

A second interpolation function is generated by interpolation summing means 49. Interpolation summing means 49 has first input connected to the scan delay circuit 27 and a second input connected to the output of the fraction-generating means at the output of analog-to-digital converter 47.

Adder 43 contains a monostable multivibrator circuit which is set whenever a second-order carry signal is generated by adder 43. The multivibrator circuit times out to a reset condition after one array scan time period has passed. The output of the multivibrator circuit is the "inhibit on second-order carry" signal shown in FIG. 1. It is connected to an input AND gate 55 and internally to adder 43, to inhibit adder 43 for the duration of one array scan time period after a second-order carry has been generated.

Interpolation summing circuit 49 is identical to summing circuit 31 and provides the second interpolation function at its output. The second interpolation function is a time-varying analog voltage waveform approximating the output that a photodetector would provide if it were continuously moved along a virtual scan path lying between two columns of array 13 as controlled by scan control 11 and shown in FIG. 2. Each virtual scan is a normalized scan.

In order to convert the analog second interpolation function waveform into a sequence of normalized digital data bits, binary sample gating means is provided. The binary sampling gate is in the form of a comparator 53 with an AND gate 55 at the output of the comparator. Any of a number of the well-known saturating differential amplifier type analog voltage comparators will operate satisfactorily as comparator 53. A first input to comparator 53 is connected to the output of summing circuit 49 and a second input of the comparator 53 is connected to a voltage threshold source. Whenever the voltage of the second interpolation waveform is greater than the threshold voltage, a binary-one voltage signal is provided at the output of comparator 53. Whenever the voltage of the second interpolation waveform is less than the threshold voltage, a binary-zero voltage level is provided at the output of comparator 53. The output of comparator 53 is connected to one input of AND gate 55. A second input to the AND gate 55 is connected to an output of adder 43, which provides an inhibit signal whenever adder 43 develops a second-order carry. A third input to the AND gate 55 is connected to a sampling clock operating at a normalized sampling rate to provide a normalized sequence of binary ones and zeros representing information stored on a document at photodetector array 13. This binary output sequence is transmitted to any of a number of well-known recognition masks 66 or other recognition circuits for the identification of the input function or pattern.

The voltage threshold signal required at the second input of comparator 53 is provided by a threshold modulation means including one-sample delay circuits 51 and 57, differentiators 59 and 61, inverting unity gain amplifier 63, as well as summing amplifier circuit 65, which has a gain of K. The one sample delay circuits 51 and 57 are identical to one-sample delay circuit 17. Differentiator circuits 59 and 61 can be passive RC or LC differentiating networks. Inverting unity gain amplifier 63 is identical to inverter 19. Summing circuit 65 is similar to summing circuit 31 with the exception that the feedback resistor is chosen with respect to the second and third input summing resistors to give an amplification of K rather than unity gain.

The voltage threshold signal $V_T$ is adjusted between each set of array sample input points in accordance wit the following equation (1):

$$V_T = V_{ref} + K(S_2 - S_1) \quad (1)$$

where $V_{ref.}$ = nominal reference threshold voltage;

$K$ = modulation gain;

$S_1$ = slope of constructed waveform one array sample time period past;

$S_2$ = slope of constructed waveform one array sample time period ahead.

The above voltage-threshold modulation is achieved by connecting the circuit of the threshold modulation means in the following manner. One-sample delay 51 is inserted into the series connection between summing circuit 49 and comparator 53, to provide access at its input to the constructed waveform one array sample time period ahead of the analog-to-digital threshold decision. One-sample delay 57 is connected to the output of delay 51 to provide access at its output to the constructed waveform one array sample time period past. Differentiator 59 has its input connected to the outputs of summing circuit 49 and its output is connected to a second input of summing circuit 65. Differentiator 61 has its input connected to the output of delay 57 and its output is connected to the input of unity gain inverting amplifier 63. The output of inverter 63 is connected to a third input of summing circuit 65. A first input of summing circuit 65 is connected to a threshold reference voltage such as an adjustable voltage source. The summing resistor of the first input of summing circuit 65 is chosen to equal the feedback resistor so that the gain factor $K$ only operates on the second and third inputs. The output of summing circuit 65 is connected to the second input of comparator 53.

OPERATION OF THE PREFERRED EMBODIMENT

Figure 2:
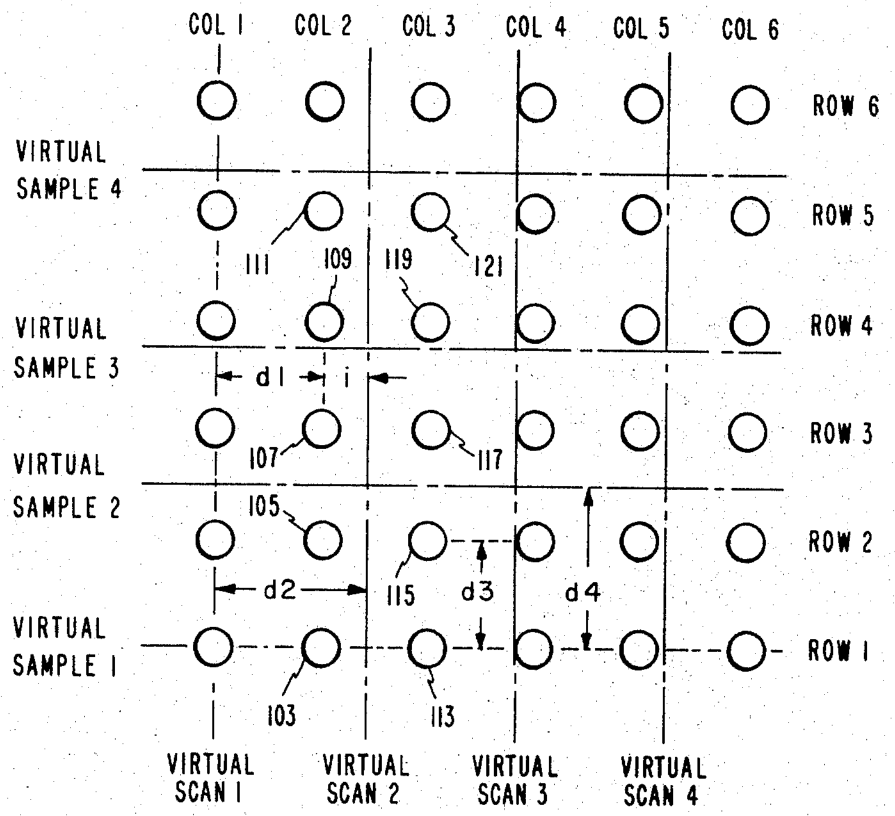
FIG. 2 shows a diagram of the location of photosensors within the photodetector array of FIG. 1 and the effective location of normalized data samples of the waveforms constructed from the outputs of the photosensors of the array.

Referring now to FIG. 2, the configuration of data to be normalized in accordance with this invention will be set forth to form a basis for a better understanding of the invention. A portion of photodetector array 13 is shown in FIG. 2, as an array of circles, each circle representing the location of a discrete photosensor. As can be seen from reference to FIG. 2, the array of photosensors is composed of columns spaced a distance d1 from each other. The photosensors are uniformly positioned in each column to define rows spaced a distance d3 from each other. The columns and rows of photodetector array 13 define scan positions and sample positions respectively at which the scanning means including scan control 11, photodetector array 13, and analog switching multiplexor 15 can provide a sequence of analog voltage output samples, each sample representing the intensity of light reflected from a document to a different photosensor of the array.

If every character on a document being read were constrained to be of equal size such that the output of analog switching multiplexor 15, when digitized by a binary sampling gate, would exactly match the size of the recognition masks 66 being used for recognition, the method and apparatus of this invention would not be necessary. In practice, however, characters on documents being read will be found to be of varying sizes, especially if they were hand written. For this reason, normalization will be required. In order to simplify normalization, the spacing between photosensors of array 13 has been chosen to be small enough so that more analog voltage samples are provided at the output of analog switching multiplexor 15, for the smallest character to be recognized, than are required for comparison with recognition masks. This allows normalization to occur always in a single direction only. That is, the number of samples and scans representing a character will always be normalized downward to a smaller number, and need never be expanded upward to provide a number of binary output bits which is greater than the original number of analog samples received from analog switching multiplexor 15. For the purposes of an example, the 25 analog voltage samples received from the photosensors located in the area including the first five columns and the first five rows of array 13 will be normalized into 16 interpolation samples from which a 16-bit binary information word can be generated by the binary sample gating means. The 16 normalized samples will represent the reflected light that would have been detected by photocells, had they existed at virtual scan and virtual sample intersections as shown in FIG. 2. Inasmuch as the actual intensity of reflected light at these locations is not known, because photodetectors to not exist there, an interpolation waveform approximating the analog voltage output that a photodetector would provide if it were continuously moved along each virtual scan path 1 through 4 in sequence as shown in FIG. 2. The constructed interpolation waveform is then sampled at a second sampling rate to obtain analog samples corresponding to virtual sample points. As shown in FIG. 2, the distance between virtual scan paths is *d*2 and the distance between virtual sample points is *d*4. The incremental displacement of each virtual scan from its closest leftmost array column is *i*.

Referring now to FIG. 1, the operation of the preferred embodiment, as previously set forth, will be explained. As described earlier with reference to FIG. 2, scan control 11 increments the output of columns photosensors of array 13 to provide a sequence of scans, each having a plurality of analog samples, to the input of analog switching multiplexor 15. Analog switching multiplexor 15 sequentially connects each of its input lines to its output line, thereby breaking up each of the sequence of scans into a sequence of analog samples at a first sampling rate controlled by the switching frequency of scan control 11 and multiplexor 15. The sequence of scans of analog samples provided at the output of multiplexor 15 represents an input function such as a character on a document from which light is reflected to the photosensors of array 13.

The output of multiplexor 15 is simultaneously delayed in one-sample delay circuit 17 and inverted in invertor circuit 19 to generated delayed samples and inverted samples. Each delayed sample is summed with a following inverted sample to generate the voltage difference between each delayed sample and the following sample at the output of summing circuit 21. The sequence of voltage differences from summing circuit 21 is integrated in integrator 23 to provide a first interpolation function, which approximates the output waveform which would be generated by a photosensor if it were continuously moved along a column of array 13 from bottom to top. If it is necessary to normalize the number of samples in only the vertical direction, the output of integrator 23 can be sampled by a binary sampling gate to provide the vertical normalized binary data which will be compared with recognition masks 66.

In order to normalize data in a horizontal of scanning direction, a second interpolation function, interpolating between two first interpolation functions, must be generated to provide virtual scans. The second interpolation function is generated by delaying the first interpolation function waveform by the scan time period corresponding to the first scanning rate. This time period is the time that scanning means 11 allows the outputs from any one column of array 13 to be connected to the inputs of multiplexor 15. While the first interpolation function is being delayed, it is also being inverted in invertor 29, thereby generating inverted scans and delayed scans. Each delayed scan is summed with a following inverted scan to generate the instantaneous voltage differences between each point of the delayed first interpolation function and a corresponding point of the first interpolation function generated from the following scan at the output of summing circuit 31.

Figure 3:
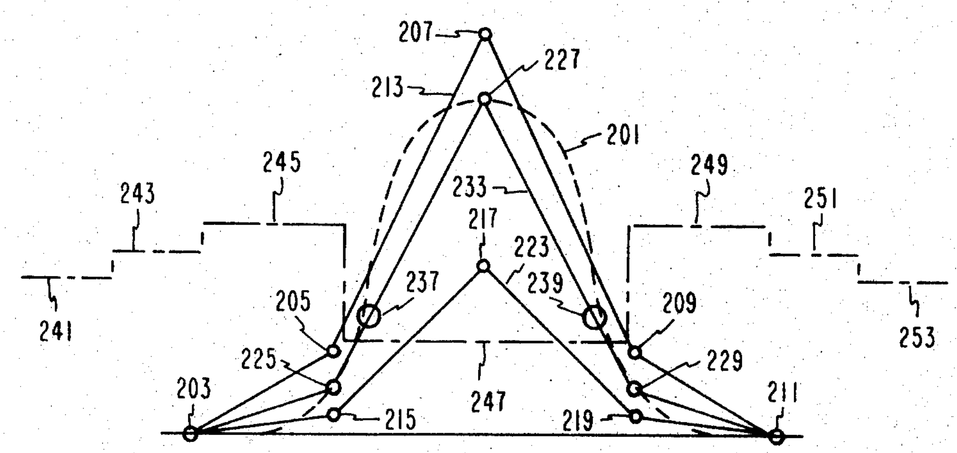
FIG. 3 shows a composite diagram of the original outputs from selected photosensors of the array, waveforms constructed therefrom, normalized samples of the constructed waveforms, as well as the modulated binary threshold voltage level.

The interpolation method can be seen more clearly by reference to FIG. 3. The points labeled 203, 205, 207, 209, and 211 represent the analog samples received from analog switching multiplexor 15 and correspond to outputs generated by photodetectors 103 through 111 in array column 2, as shown in FIG. 2. After the output of photodetector 103 has been delayed by one sample time and the output of photosensors 105 has been inverted, the difference between the amplitudes from photosensors 103 and 105 can be found and integrated to generate the straight line shown between points 203 and 205 of FIG. 3. This process is continued for each analog sample received from multiplexor 15, thereby generating the first interpolation function waveform labeled 213 as shown, in FIG. 3. Another first interpolation function waveform 223 is generated by the same sample-voltage difference determining and integrating steps performed on the outputs of photodetectors 113 through 121 which have magnitudes corresponding to points labeled 203, 215, 217, 219, and 211 in FIG. 3.

After waveform 213 is delayed in delay circuit 27, the instantaneous voltage differences between points of first interpolation function waveform 213 and corresponding points on nondelayed first interpolation function waveform 223 can be found as previously described and provided at the output of summing circuit 31. A fraction of these instantaneous voltage differences must now be found in order that it can be added to the corresponding instantaneous voltages of delayed first interpolation function waveform 213 in order to generate a second interpolation waveform 233 which is an interpolation between first interpolation function waveforms 213 and 223.

The fraction of the instantaneous voltage differences is found by performing the following steps. An incremental displacement number will exist in incremental displacement register 45. The incremental displacement number $i$ is the incremental displacement of a virtual scan from its left-most closest array column. The displacement of virtual scan 1 in FIG. 2 is zero because its location coincides with the location of array column 1. For purposes of example, let us assume that we are determining the fraction of the instantaneous voltages between the first interpolation function generated from analog samples from array column 2 and the first interpolation function generated from analog samples from array column 3. We are therefore determining the location of virtual scan 2. Since the incremental displacement of virtual scan 1 from its left-most array column, which was array column 1, is zero, incremental displacement register 45 will contain a number zero. The first step in determining the fraction is to add the previous incremental displacement number (0 in this case) to the number $d2$ which represents the displacement between virtual scans as shown in FIG. 2. This addition step is performed in adder 43. For purposes of this example, let us assume that we desire to locate virtual scans between array columns at an accuracy of one part in 32. Adder 43 and register 45 will therefore have fives stages and the distance $d1$ between array columns will be expressed in terms of 32 units. If we also assume for purposes of example that the distance between virtual scans, to accomplish the proper degree of horizontal normalization, must be 45 units, it can be seen that when the number 45 is added to 0 in a five stage binary adder, a first-order carry will be generated, along with a remainder of 13. The remainder of 13 is the new incremental displacement number $i$ which is stored in five-stage register 45. When the first-order carry was generated within adder 43, the second step, a subtracting step was inherently performed by subtracting 32 (i.e., $2^5$) from the sum of $d1$ and the previous incremental displacement number (0 in this case). We now have a binary number 13 stored in register 45, which represents a fraction having 13 in the numerator and 32 in the denominator. The third step is to multiply this fraction by each instantaneous voltage difference from summing circuit 31 in digital-to-analog converter 47, which provides an analog output proportional to thirteen thirty-seconds of the instantaneous voltage differences at the analog reference input. In this example, note that the instantaneous voltage differences are negative, because the first interpolation function waveform 223 is less than the delayed first interpolation waveform 213.

After the predetermined fraction of each instantaneous voltage difference has been generated in digital-to-analog converter 47, it is added to the corresponding instantaneous voltage of the delayed first interpolation function, from scan delay 27, in interpolation summing circuit 49, to generate a second interpolation function waveform, shown as waveform 233 in FIG. 3. Note that the amplitudes of points on waveform 233 are thirteen thirty-seconds of the difference between the amplitudes of waveforms 213 and 223 respectively. Second interpolation function waveform 233 approximates waveform 201, which would have been provided by a single photosensor if it had been moved along virtual scan path 2, shown in FIG. 2.

After the second interpolation function waveform has been generated, it is sampled at a normalized sampling rate by the binary sampling gate to provide a digital output of a normalized number of bits per scan.

Referring again to FIG. 2, the operation of the preferred embodiment in normalizing the number of interpolation will be set forth. An incremental displacement number $i=13$ is stored in register 45 while analog samples from array columns 2 and 3 are being used to generate the second interpolation function waveform. After virtual scan 2 has been completed, the number $d2$ (in this case 45) will again be added to the incremental displacement number $i$ (in this case 13) to generate a new incremental displacement number $i = 26$ which will be stored in register 45 in place of the previous incremental displacement number. While a first interpolation function and a delayed interpolation function are being generated from analog samples from array columns 3 and 4, a second interpolation function will be created therefrom by adding twenty-six thirty-seconds of the instantaneous differences between amplitudes of the delayed first interpolation function and the inverted first interpolation function, to generate a second interplation approximating the output of a photocell if it were continuously moved along virtual scan path 3.

After all of the analog samples from array columns 3 and 4 have been converted into the second interpolation function waveform, analog samples from array columns 4 and 5 will be utilized to generate another delayed first interpolation function waveform and another inverted first interpolation waveform respectively. Also, the number $d2$ (in this case 45) will again be added to the previous incremental displacement number (now equal to 26) to give a new incremental displacement number of 47, in addition to a first-order carry representing a subtraction of 32, and a second order carry representing a second subtraction of 32. The second order carry indicates that no virtual scans exist between array column 4 and array column 5, and therefore any outputs of the second interpolation summing circuit should be inhibited while analog data samples from array column 5 are being received from the scanning means. The second-order carry signal is connected as an inhibit input to AND gate 55 to prevent the gating of any binary outputs from the second interpolation function, which was generated from analog samples from array columns 4 and 5. The second-order carry signal will be stored in the monostable multivibrator circuit within adder 43, to inhibit adding the number $d2$ to the incremental displacement number $i$ at the end of the scan of array column 5. The previous incremental displacement number $i$ (which is still equal to 7) will be used to generate the second interpolation function, corresponding to virtual scan 4, by adding seven thirty-seconds of the difference in amplitudes between the delayed first interpolation function from array column 5 and the first interpolation function from array column 6, to the delayed first interpolation function from array column 5.

As each second interpolation waveform corresponding to a normalized virtual scan is generated, it is converted to a binary waveform by comparator 53 and sampled at a normalized second sampling rate by AND gate 55, to provide a sequence of normalized binary bits representing information on the document being scanned by array 13.

While the invention has been particularly shown and described with reference to a preferred embodiment thereof, it will be understood by those skilled in the art that various changes in form and detail may be made therein without departing from the spirit and scope of the invention. For example, the number of photosensors in the array has been chosen to be large enough to be always greater than the number of normalized binary data bits to be generated therefrom. With the teachings of the disclosed embodiment of the invention in mind, it would be within the skill of the art to add a recirculating delay means at the output of the inverting means and to implement the disclosed delay circuits as recirculating delay means in order to allow repeated interpolation between array analog samples or between first interpolation functions generated therefrom to construct plural second interpolation waveforms between array columns.

The operation of the threshold modulation means, in accordance with Equation (1), will now be described. A nominal reference threshold voltage $V_{ref}$ is provided to one input of summing circuit 65. This normal reference threshold is shown in FIG. 3 as the amplitude 241 of the threshold voltage signal. For purposes of example let us assume that the slope of waveform 233 is "0" prior to sample 203, "1" between samples 203 and 225, "2" between samples 225 and 227, "−2" between samples 227 and 229, "−1" between samples 229 and 211, and "0" thereafter. The output of differentiator 59 provides a signal proportional to the slope $S_2$ of waveform 233, one array sample time period ahead of the signal at the input of comparator 53, which latter signal has been delayed by delay 51. The output of inverter 63 provides a signal proportional to the inverse of the slope $S_1$ of waveform 233, one array sample time period past with respect to the signal at the input of comparator 53, since the latter signal has not been delayed by delay 57. Summing circuit 65 further provides gain control, so that a signal appears at its output having amplitude of $V_{ref} + K(S_2 - S_1)$, where $K$ is the modulation gain, or, in other words, the amount of modulation about nominal threshold $V_{ref}$.

Referring again to FIG. 3, the amplitude 243 of the binary threshold voltage is $V_{ref}+K$ since the slope $S_2$ of waveform 233 is "1" between points 203 and 225, and $S_1$ is "0" prior to point 203. In like manner the amplitude 247 is $V_{ref}-K$ since the slope $S_2$ of waveform 233 is "−2" between points 227 and 229 and 229 and $S_1$ is "1" between points 203 and 225. The amplitude of the binary threshold voltage, at which the output of comparator 53 switches, is thus modulated to force a binary-one bit if the amplitude of the constructed second interpolation waveform rises above the nominal reference threshold $V_{ref}$, even though a normalized sample, such as 237 or 239, does not coincide with the constructed waveform while it is above the reference threshold.

By way of further example, the circuitry of the preferred embodiment of the method of this invention has been disclosed in analog form. It would be within the skill of the art to replace the analog circuits with their digital counterparts in order to practice the method of the invention.

What is claimed is:

1. A data normalizing method comprising the steps of:

receiving an input sequence of samples at a first sampling rate, said samples representing an input pattern;

delaying each sample in said input sequence by the time period between successive ones of said samples;

determining the differences between the amplitudes of each delayed sample and a following one of said received samples;

integrating said differences to generate an interpolation function;

generating a threshold function;

producing an output sequence of binary-valued samples at a second sampling rate, each sample in said output sequence being indicative of the relative amplitudes of said interpolation function and said threshold function, thereby changing the number of samples representing said input pattern to a normalized number; and recognizing said input pattern from said normalized number of samples in said output sequence.

2. The method of claim 1 wherein said input sequence is received from at least one photosensor.

3. The method of claim 2 wherein said first sampling rate exceeds said second sampling rate.

4. The method of claim 2 comprising the further step of modulating said threshold function in response to the amplitudes of the samples in one of said sequences.

5. A data normalizing method comprising the steps of:

receiving a sequence of scans of samples at a first scanning rate and a first sampling rate representing an input function;

delaying said sequence by one first sample time period;

determining the differences between the amplitudes of each delayed sample and a corresponding one of said received samples;

integrating said differences to generate a first interpolation function;

delaying said first interpolation function by a first scan time period;

determining the differences between the amplitudes of points of the delayed first interpolation function and corresponding points of said first interpolation function;

adding a fraction of said differences to said delayed first interpolation function to generate a second interpolation function, representing a normalized scan;

sampling said second interpolation function at a second sampling frequency, thereby changing the number of samples and the number of scans representing said input function to a normalized number of scans of a normalized number of samples.

6. The method of claim 5 wherein said first sampling rates exceeds said second sampling rate.

7. The method of claim 6 wherein said fraction is generated by further steps comprising:

adding a previous incremental displacement fraction to a ratio of the displacement between normalized scans and the displacement between scans at said first scanning rate in an adder having $n$ stages, where $n$ is an integer and where the displacement between scans at said first scanning rate is $2^n$ to generate a sum;

subtracting $2^n$ from said sum within said adder by generating a first carry signal and a remainder, said remainder being a present incremental displacement fraction;

multiplying said second differences by said remainder in multiplication means having $n$ states to generate a signal representing said fraction of said second differences.

8. The method of claim 7 further comprising the steps of:

inhibiting said sampling step whenever a second order carry signal is generated within said adder causing $2^{n+1}$ to be subtracted from said sum;

inhibiting said adding and subtracting steps when generating said fraction for a next following normalized scan.

9. Data normalizing apparatus comprising:

scanning means for scanning a document and providing at an output, a sequence of samples at a first sampling rate, said samples having amplitudes proportional to light reflected from areas of said document;

first delay means connected to the output of said scanning means for delaying said sequence of samples by one first sample time period;

first difference generating means having a first input connected to the output of said scanning means and a second input connected to the output of said first delay means for generating an output proportional to the difference between a present sample and a delayed sample;

integrating means connected to the output of said first difference generating means for integrating the differences between said present and said delayed samples thereby generating a first interpolation function;

second delay means for delaying said first interpolation function by one scan time period;

second difference generating means having a first input connected to the output of said integrating means and a second input connected to the output of said second delay means for generating a signal proportional to the amplitude difference between corresponding points of said first interpolation function and the delayed first interpolation function;

fraction generating means having a first input connected to the output of said second difference generating means and a second input for receiving a proportion to the displacement between normalized scans for generating a signal which is a fraction of said output of said second difference generating means;

interpolation summing means having a first input connected to the output of said second delay means and having a second input connected to the output of said fraction generating means for summing said delayed first interpolation function with said signal from said fraction generating means to provide a second interpolation function;

binary sample gating means connected to the output of said third summing means for providing binary one outputs when the output of said third summing means is above a predetermined voltage threshold and providing binary zero outputs when the output of said third summing means is below said predetermined voltage threshold.

10. The apparatus of claim 9 wherein said fraction generating means further comprises:

first register means for storing a previous fraction;

adding means having $n$ stages where $n$ is an integer, and where $2^n$ is the distance between array columns, said adding means having a first input connected to the output of said first register means and having a second input for receiving a number which is the ratio of the distance between normalized scans to the distance between scans at said first scanning rate, said adding means having a first output connected to said first register for storing the output of said $n$ stages in said first register.

11. The apparatus of claim 10 wherein said adding means further comprises a second order carry output connected to an inhibit input of said binary sample gating means to inhibit said binary outputs therefrom whenever a second order carry signal is generated by said adding means.

* * * * *